United States Patent
Rana et al.

(10) Patent No.: US 11,497,020 B1
(45) Date of Patent: Nov. 8, 2022

(54) SELECTION OF A SHARED CHANNEL BASED ON A CHANNEL OCCUPANCY MEASUREMENT

(71) Applicant: Apple Inc., Cupertino, CA (US)

(72) Inventors: Shehla S. Rana, Cupertino, CA (US); Oren Shani, Saratoga, CA (US); Rajneesh Kumar, San Jose, CA (US); Yang Yu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/332,401

(22) Filed: May 27, 2021

(51) Int. Cl.
*H04W 72/04* (2009.01)
*H04W 74/08* (2009.01)
*H04W 24/08* (2009.01)

(52) U.S. Cl.
CPC ....... *H04W 72/0453* (2013.01); *H04W 24/08* (2013.01); *H04W 74/0808* (2013.01)

(58) Field of Classification Search
CPC ... H04B 17/309; H04B 17/318; H04W 24/10; H04W 72/0453
See application file for complete search history.

(56) References Cited

U.S. PATENT DOCUMENTS

| 2002/0188723 A1* | 12/2002 | Choi | H04W 36/06 709/225 |
| 2016/0338118 A1* | 11/2016 | Vajapeyam | H04B 17/318 |
| 2020/0314917 A1* | 10/2020 | Jeon | H04W 74/08 |

FOREIGN PATENT DOCUMENTS

| WO | WO-2015197129 A1 * | 12/2015 | ............ H04W 16/14 |
| WO | WO-2020221703 A1 * | 11/2020 | ............ H04W 36/30 |

* cited by examiner

*Primary Examiner* — Kevin Kim
(74) *Attorney, Agent, or Firm* — Sterne, Kessler, Goldstein & Fox P.L.L.C.

(57) ABSTRACT

Some aspects of this disclosure relate to apparatuses and methods for implementing techniques for a first wireless device to select a channel to a second wireless device among a set of channels to the second wireless device shared by a set of wireless devices of the wireless network, and further transmit data to the second wireless device over the selected channel. The first wireless device can perform a measurement to determine a channel occupancy during a measurement period for a channel, wherein the measurement period includes a plurality of periodic transmission durations. The first wireless device can select a channel that is less occupied indicated by the channel occupancy of the channel. The first wireless device can further transmit data to the second wireless device over the selected channel in a transmission period after the measurement period.

20 Claims, 8 Drawing Sheets

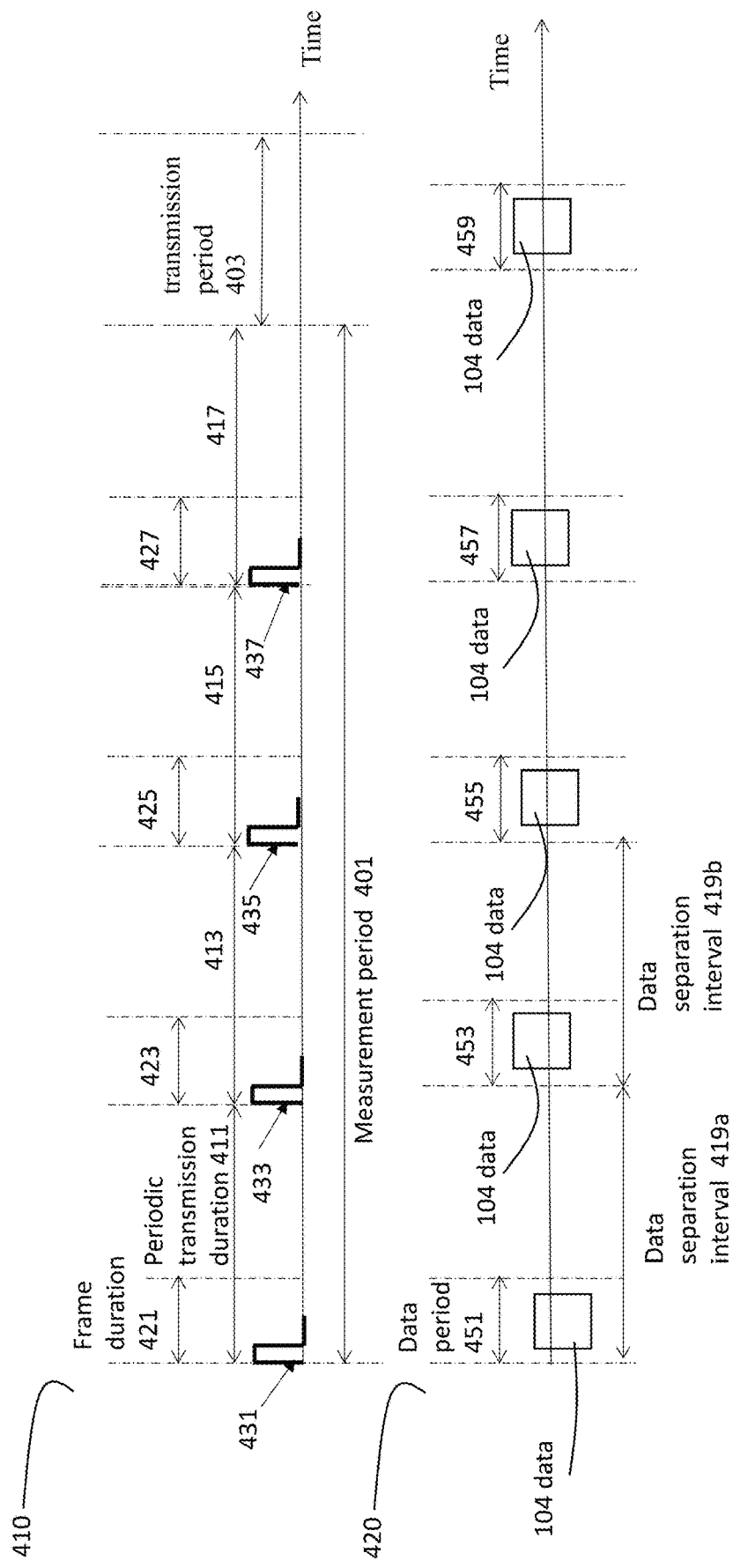

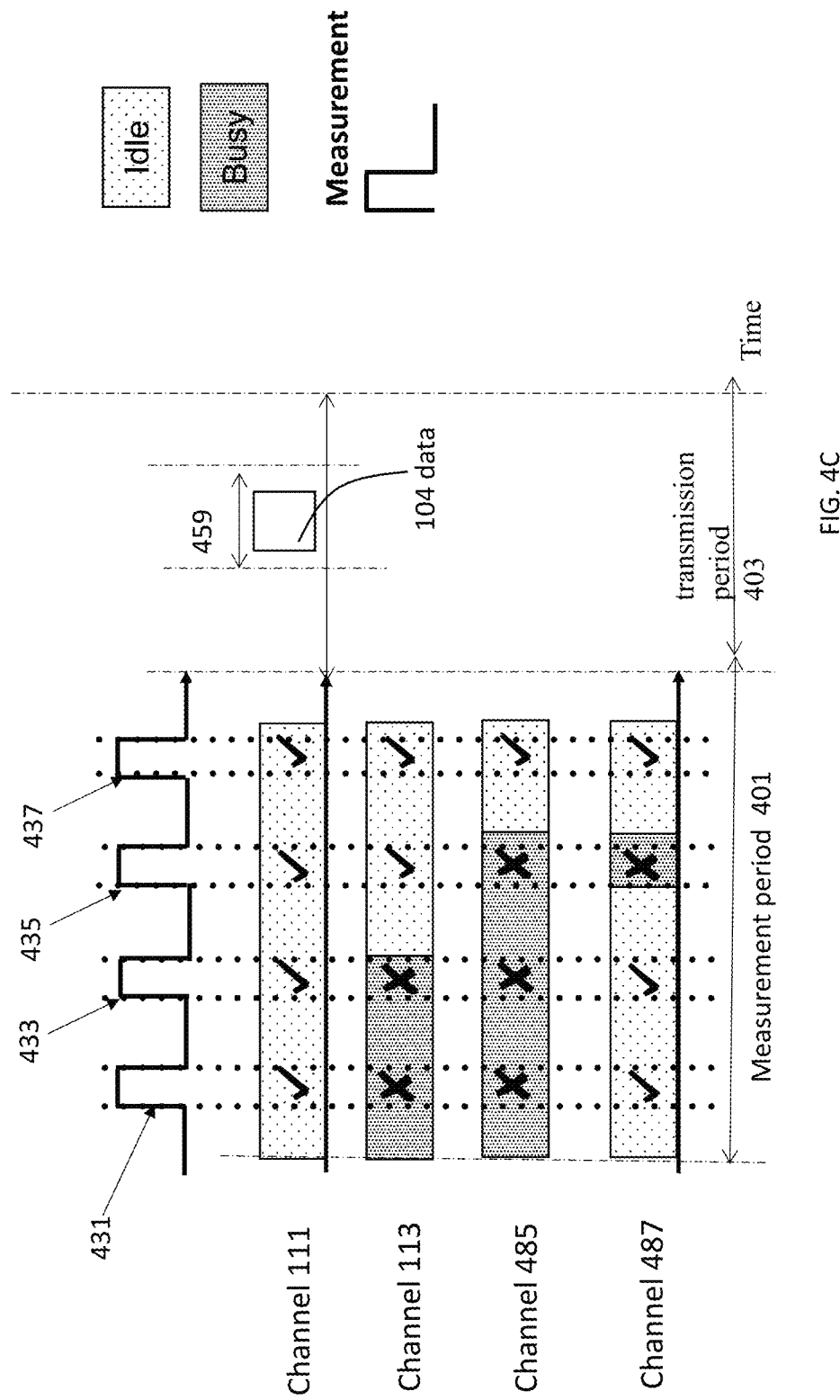

SELECTION OF A SHARED CHANNEL BASED ON A CHANNEL OCCUPANCY MEASUREMENT

BACKGROUND

Field

The described aspects generally relate to selecting a channel among a set of channels shared by multiple wireless devices in a wireless network.

Related Art

Wireless technology has helped to simplify networking by enabling multiple wireless devices, nodes, or wireless stations (STAs) simultaneously share resources in a home or business through a wireless network without additional or intrusive wiring. Wireless devices can include many kinds of devices, e.g., a smart phone, a laptop, a camera, a gaming device, a medical device, a biometric sensor, a wearable device, or more. Many applications can be operated on wireless devices, e.g., sharing network printers, data files, streaming audio and video, and more. In a wireless network, multiple wireless devices can share a set of channels for communication, which may cause congestion or performance degradation. Mechanisms are desired to improve the performance of applications operated on wireless devices over shared channels in a wireless network.

SUMMARY

Some aspects of this disclosure relate to apparatuses and methods for implementing techniques for a wireless device to select a channel among a set of channels shared by multiple wireless devices or wireless stations (STAs) in a wireless network based on channel occupancies of the channels. An application can be operated on a wireless device to generate data periodically to be transmitted to another wireless device, e.g., an access point, over channels that are shared by multiple wireless devices. The wireless device can perform measurements to determine channel occupancies during a measurement period for the channels, and select a channel based on the channel occupancies. The measurement period can include a plurality of periodic transmission durations, where a periodic transmission duration can include a frame duration. A frame duration, hence the periodic transmission duration, can be correlated with a data period of the application when data are generated. The measurement of a channel can be performed by monitoring the channel without transmitting data on the channel during the measurement period. After the wireless device selects a channel based on the channel occupancy of the channel over the measurement period, data generated by the application can be transmitted in a transmission period after the measurement period.

According to some aspects, the wireless device can include a transceiver and a processor communicatively coupled to the transceiver. The transceiver can wirelessly communicate with an access point of a wireless network over a set of channels to the access point shared by a set of wireless devices of the wireless network. The wireless network can include the access point and the set of wireless devices. The set of channels can be in a 2.4 GHz frequency band, or a 5 GHz frequency band, and the set of channels can include 11 channels or 45 channels.

In some examples, the processor can perform a first measurement to determine a first channel occupancy for a first channel of the set of channels during a measurement period. The measurement period includes a plurality of periodic transmission durations. The first measurement is performed by monitoring the first channel without transmitting data on the first channel at least at a first time instance of a first periodic transmission duration and at a second time instance of a second periodic transmission duration. Similarly, the processor can further perform a second measurement to determine a second channel occupancy for a second channel of the set of channels during the measurement period. The second measurement is performed by monitoring the second channel without transmitting data on the second channel at least at the first time instance of the first periodic transmission duration and at the second time instance of the second periodic transmission duration. In addition, the processor can select the first channel to the access point based on a comparison of the first channel occupancy with the second channel occupancy. In some examples, the first channel is selected for communication with the access point based on the first channel occupancy being less than the second channel occupancy. Afterwards, the processor can cause the transceiver to transmit to the access point data generated by an application operated on the wireless device in a transmission period after the measurement period. The application operated on the wireless device can generate data within a data period periodically, and the data period correlates with a periodic transmission duration and a frame duration of the periodic transmission duration. In some examples, the data period has a same length of time as the periodic transmission duration, and the transmission period has a same length of time as the measurement period.

In some examples, the first measurement to determine the first channel occupancy is performed by continuously monitoring the first channel during the entire measurement period, and the second measurement to determine the second channel occupancy is performed by continuously monitoring the second channel during the entire measurement period. The wireless device can further include a receiver coupled to the transceiver and the processor, where the receiver can consume less power than the transceiver, and can monitor the first channel and the second channel continuously during the entire measurement period.

In some examples, the first channel measurement to determine the first channel occupancy indicates energy sensed during a first portion of time of the measurement period and indicates substantially no energy sensed during a second portion of time of the measurement period.

In some examples, the first measurement to determine the first channel occupancy indicates a number of wireless devices sharing the first channel to the access point. In some other examples, the first channel occupancy is determined based at least on an average wait time calculated based on a number of times the first channel is determined to be idle at beginning time instances of periodic transmission durations of the plurality of periodic transmission durations within the measurement period, and a frame duration within a periodic transmission duration of the plurality of periodic transmission durations, where the frame duration corresponds with a data period for the data generated by the application operated on the wireless device. In some other examples, the first channel occupancy is determined based on a collision probability calculated based on a number of times the first channel is determined to be idle at beginning time instances of periodic transmission durations of the plurality of periodic transmission durations within the measurement period, and a number of data collisions detected during the periodic transmission durations.

According to some aspects, a method for wireless communication can include performing, by a wireless device and during a measurement period, a first measurement to determine a first channel occupancy for a first channel of a set of channels to an access point shared by a set of wireless devices of a wireless network. The measurement period can include a plurality of periodic transmission durations. The first measurement is performed by monitoring the first channel without transmitting data on the first channel at least at a first time instance of a first periodic transmission duration and at a second time instance of a second periodic transmission duration. The method can further include performing a second measurement to determine a second channel occupancy for a second channel of the set of channels during the measurement period. The second measurement is performed by monitoring the second channel without transmitting data on the second channel at least at the first time instance of the first periodic transmission duration and at the second time instance of the second periodic transmission duration. In addition, the method can include selecting the first channel for communication with the access point based on a comparison of the first channel occupancy with the second channel occupancy. Furthermore, the method can include transmitting or causing to transmit to the access point data generated by an application in a transmission period after the measurement period.

According to some aspects, a non-transitory computer-readable medium can store instructions that, when executed by a processor of a wireless device, cause the wireless device to perform operations. The operations can include performing, during a measurement period, a first measurement to determine a first channel occupancy for a first channel of a set of channels to an access point shared by a set of wireless devices of a wireless network. The measurement period can include a plurality of periodic transmission durations. The first measurement is performed by monitoring the first channel without transmitting data on the first channel at least at a first time instance of a first periodic transmission duration and at a second time instance of a second periodic transmission duration to determine the first channel is idle or occupied. The operations can further include performing a second measurement to determine a second channel occupancy for a second channel of the set of channels during the measurement period. The second measurement is performed by monitoring the second channel without transmitting data on the second channel at least at the first time instance of the first periodic transmission duration and at the second time instance of the second periodic transmission duration. In addition, the operations can include selecting the first channel for communication with the access point based on a comparison of the first channel occupancy with the second channel occupancy. Furthermore, the operations includes transmitting or causing to transmit to the access point data generated by an application in a transmission period after the measurement period.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIGS. 4A-4C illustrate example measurements to determine channel occupancies of channels shared by multiple wireless devices of a wireless network, according to some aspects of the disclosure.

Figure 1:
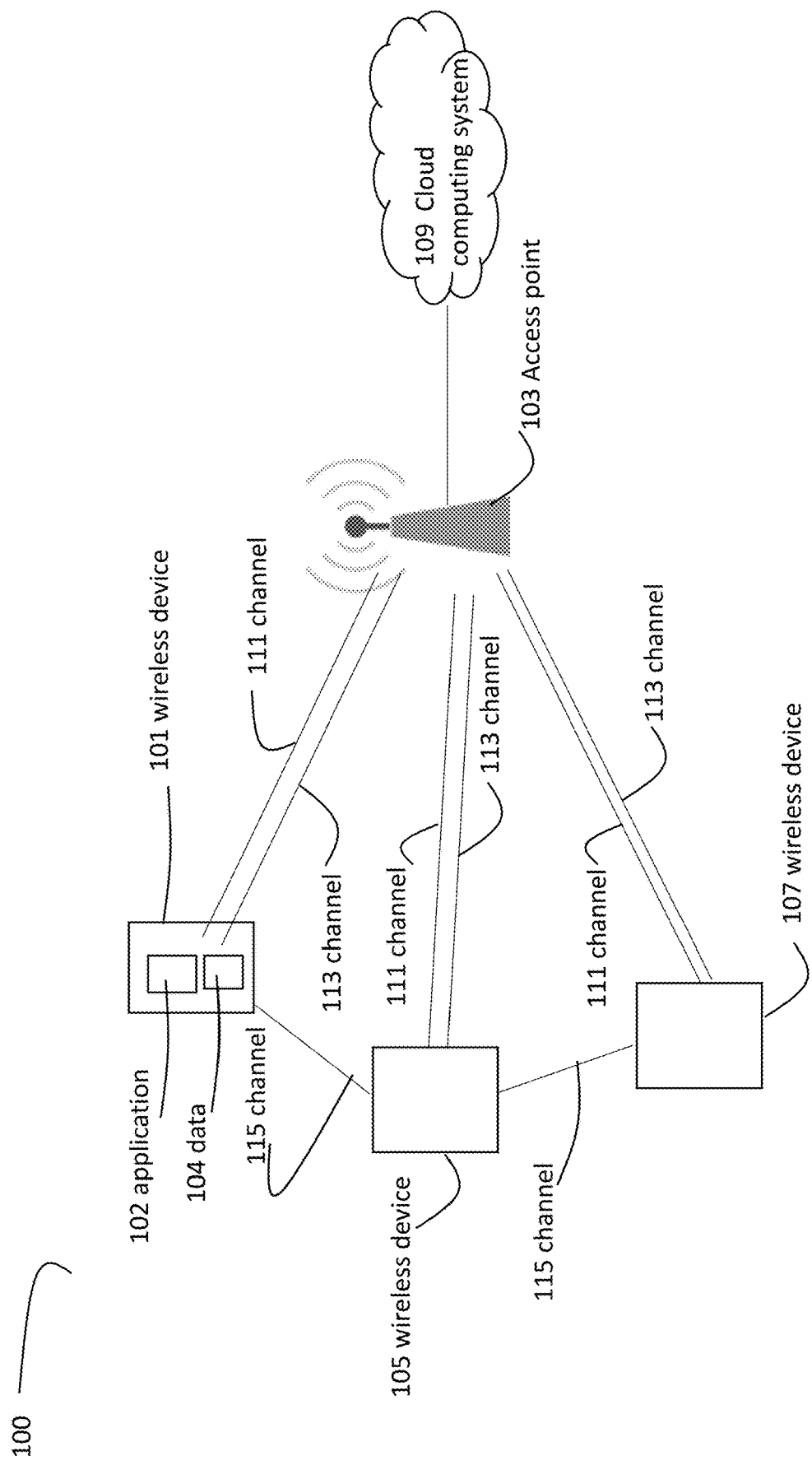
FIG. 1 illustrates an example wireless network including a wireless device to select a channel among a set of channels shared by multiple wireless devices based on channel occupancies of the channels during a measurement period, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A wireless network can include multiple wireless devices, nodes, or wireless stations (STAs), and one or more access points. A wireless device can be referred to as a node, a device, or a STA as well. In a wireless network, multiple wireless devices can share a set of channels from the wireless devices to another wireless device, e.g., an access point for communication. A wireless device can listen to the set of shared channels to determine when the channels are idle and available for transmission, and further select a channel from the set of channels to transmit data generated by an application operated on the wireless device. In some examples, a wireless device can select a channel to transmit data when the channel is detected to be idle and available. A channel can be determined to be idle and available when an energy measured on the channel is below a predetermined threshold. This process is known as clear channel assessment (CCA).

However, such a mechanism in determining a channel to be idle and available based on the energy measurement, and further transmitting data once the channel is determined to be idle and available, can cause performance problems for the application generating data to be transmitted. For example, there can be some special messages, e.g., clear to send (CTS) to self (CTS2SELF) message, which does not transmit any data itself during a period of time. Hence, the energy measurement will be low during the period of time defined by the CTS2SELF message. However, the CTS2SELF message can block the channel from being used to transmit any data. If a channel is determined to be idle based on the low energy measurement on the channel during the period of time for the CTS2SELF message, the wireless device can reach a wrong conclusion that the channel is idle and available.

In addition, a low-latency application operated on a wireless device can have data generated and transmitted periodically, where the data is generated in data periods of short length. Hence, a low-latency application may need to access a channel for transmission with a period correlated with the data period when data are generated. Such a low-latency application may post additional challenges to the mechanism of determining a channel to be idle and available based on the energy measurement only.

In detail, determining a channel to be idle and available based on the energy measurement of the channel during a time duration can fail to consider the pattern of the energy of the channel within the time duration. For example, a first channel can have energy measured during the first half of the time duration, but idle at the second half of the time duration. A second channel can have a periodic idle time interval every 1 ms, and with an overall energy measured the same as the energy measured for the first channel. Even though the first channel and the second channel may have the same energy measurements over a predetermined time period, the two channels can accommodate different data traffic. A low-latency application can be transmitted on the second channel successfully due to its periodic idle time, but can fail to be transmitted on the first channel that is blocked during the first half of the time duration. Hence, determining a channel to be idle and available based only on the energy measurement can fail to recognize the differences between the first channel and the second channel.

Once a channel is determined to be free, normally, a wireless device can transmit data on the free channel. This kind of mechanism may work for a general application, but can fail to find a channel that is a good fit to transmit data for a low-latency application. The channel can be free at the moment being measured or monitored, but may become occupied afterwards. The mechanism of transmitting data once a free channel is available can fail to consider the future congestion pattern of the channel.

According to some aspects, a wireless device can perform a measurement to determine a channel occupancy for a channel. During a measurement period, a channel can be determined to be idle and available for transmission. However, the wireless device does not transmit data during the measurement period. Instead, various measurements can be performed when the channel is determined to be available, while no data is transmitted. Data is transmitted at a transmission period after the measurement period. The measurement period and the transmission period can occur one after another in a periodic manner. By having a measure period, the wireless device can gather a more complete picture of the congestion pattern of the channel, and select a better option for a low-latency application that generates and transmits data periodically.

In addition, an application can be operated on the wireless device to generate data periodically during data periods. The measurement period can include a plurality of periodic transmission durations, where periodic transmission durations can be correlated with the data period of the application. A wireless device can perform a measurement to determine a channel occupancy by monitoring the channel without transmitting data on the channel during the measurement period. In other words, the wireless device can perform a dry-run on the set of channels to perform the measurement to determine the channel occupancy before selecting a channel for data transmission.

Furthermore, various measurements can be performed on the channel during the measurement period, where the measurement period can include multiple periodic transmission durations. The channel occupancy can be determined based on an average waiting time calculated based on a number of times the channel is determined to be idle at a beginning time instance of a periodic transmission duration. The channel occupancy can be determined by monitoring the number of data collisions during an entire periodic transmission duration when the channel is determined to be idle at a beginning time instance of the periodic transmission duration. The channel occupancy can be determined by continuously monitoring the channel during the entire measurement period. A wireless device can determine the channel occupancy based on a number of wireless devices sharing the channel during the entire measurement period. In addition, a wireless device can monitor the channel during the entire measurement period to determine a first portion of time during which the first channel is indicated as occupied, and a second portion of time during which there is no energy sensed on the first channel, where the second portion of time is within the first portion of time.

According to some aspects, after the wireless device determines the channel occupancy for a set of shared channels, the wireless device can select a channel from the set of shared channels that is least occupied, or relatively not less occupied compared to one or more other channels. Afterwards, data generated by the application can be transmitted in a transmission period after the measurement period.

FIG. 1 illustrates an example wireless network 100 including a wireless device 101 to select a channel among a set of channels shared by multiple wireless devices based on channel occupancies of the channels during a measurement period, according to some aspects of the disclosure. Wireless system 100 is provided for the purpose of illustration only and does not limit the disclosed aspects.

In some examples, wireless network 100 can be a wireless local area network (WLAN), e.g., an IEEE 802.11a WLAN, an IEEE 802.11b WLAN, an IEEE 802.11g WLAN, an IEEE 802.11n WLAN, an IEEE 802.11ac WLAN, a Bluetooth WLAN, or a Home Radio Frequency (HomeRF) WLAN. Wireless network 100 can include, but is not limited to, wireless device 101, access point 103, wireless device 105, wireless device 107, and cloud computing system 109. There can be other network entities, e.g., additional access points, network controller, a relay station, bridges, routers, not shown. Other networks can be formed as well, e.g., virtual private network (VPN), a wireless LAN (WLAN), a wide area network (WAN), a wireless wide area network (WWAN), a metropolitan area network (MAN), a portion of the Internet, a cellular telephone network, a WiMax network, any other type of network, or a combination of two or more such networks.

In some examples, wireless device 101 communicates with access point 103 over a set of channels, e.g., channel 111 and channel 113, which can be shared by other wireless devices, e.g., wireless device 105 and wireless device 107. The set of channels can be in 2.4 GHz frequency band, or 5 GHz frequency band. The set of channels can includes 11 channels or 45 channels, as an example. There can be other channels between the wireless devices, e.g., channel 115 between wireless device 101 and wireless device 105, which is shared by wireless device 105 and wireless device 107. Wireless device 101 can be configured to operate in an ad hoc mode to communicate with other wireless devices, or an infrastructure mode to communicate with access point 103.

In some examples, access point 103 can be communicatively coupled to cloud computing system 109. Cloud computing system 109 can include an environment that delivers computing as a service, whereby shared resources, services, etc. Cloud computing system 109 can provide computation, software, data access, storage, and/or other services that do not require end-user knowledge of a physical location and configuration of a system and/or a device that delivers the services.

In some examples, wireless device 101 can include a cellular phone, a smart phone, a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device, a biometric sensor, a wearable device, an entertainment device, a vehicular component, a smart meter, an industrial manufacturing equipment, a global positioning system device, an Internet-of-Things (IoT) device, a machine-type communication (MTC) device, or an evolved or enhanced machine-type communication (eMTC) device.

In some examples, an application 102 can be operated on wireless device 101 to generate data 104 to be transmitted to access point 103. Data 104 can be generated during a data period in a periodic manner.

Figure 2:
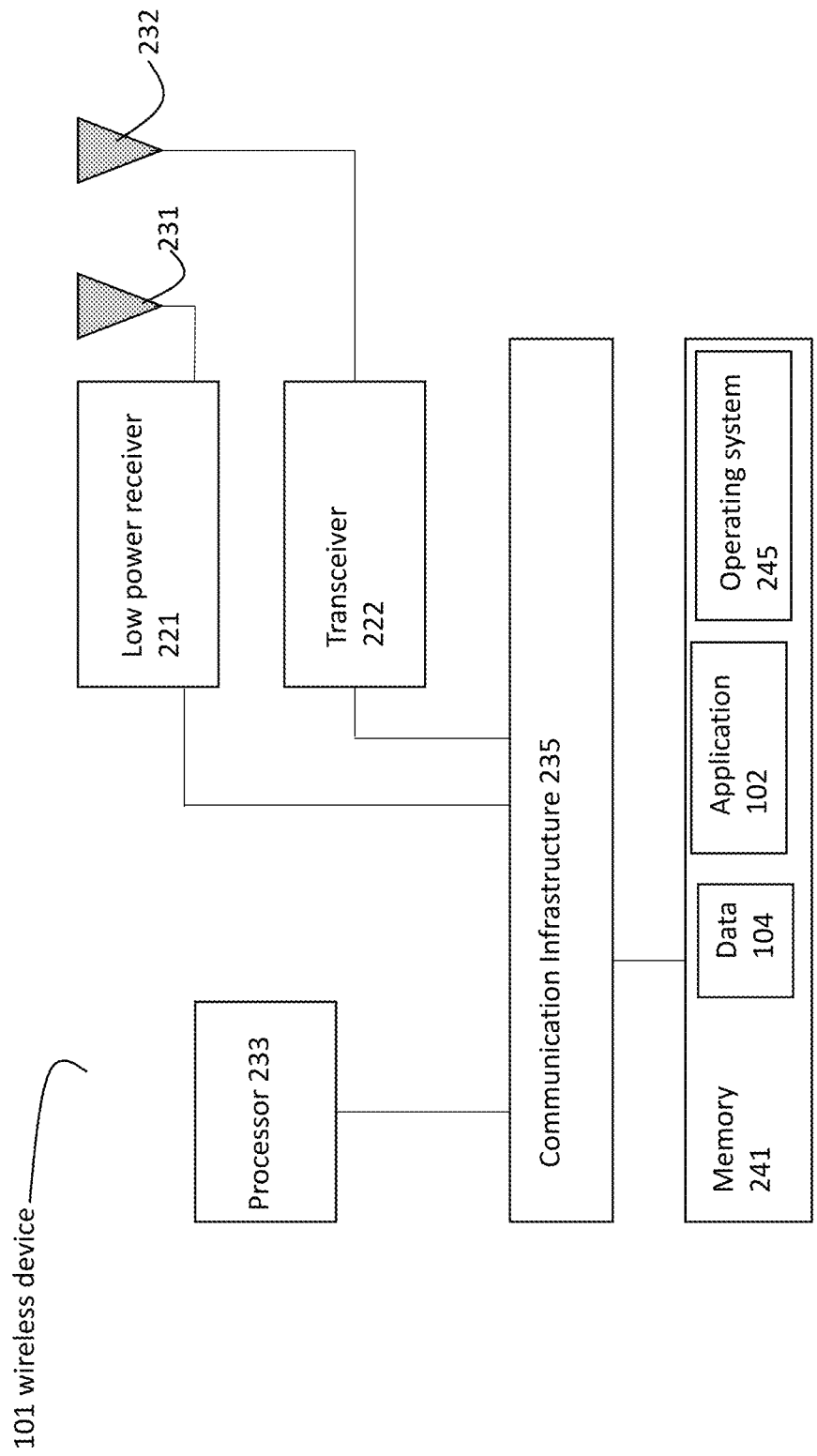
FIG. 2 illustrates a block diagram of an example wireless device including a transceiver to wirelessly communicate with other wireless devices in a wireless network, according to some aspects of the disclosure.

FIG. 2 illustrates a block diagram of wireless device 101 including a transceiver to wirelessly communicate with other wireless devices in a wireless network, e.g., access point 103 or wireless device 105.

According to some aspects, wireless device 101 can include transceiver 222 coupled to one or more antenna 232 to wirelessly communicate with access point 103 or other wireless devices, e.g., wireless device 105. In addition, wireless device 101 can include receiver 221 coupled to one or more antenna 231 to wirelessly communicate with access point 103 or other wireless devices, e.g., wireless device 105. Receiver 221 can perform fewer functions than transceiver 222. Transceiver 222 can transmit data to another device and receive data from another device, while receiver 221 can only monitor the channels and receive data, without transmitting data. Hence, receiver 221 can consume less power than transceiver 223. Transceiver 222 and receiver 221 can wirelessly communicate with access point 103 over a set of channels, e.g., channel 111 and channel 113, shared by a set of wireless devices of wireless network 100. Due to lower power consumption than transceiver 222, receiver 221 can monitor channel 111 and channel 113 continuously, in a relatively power efficient manner.

In addition, wireless device 101 can include processor 233, memory 241, both being communicatively coupled to communication infrastructure 235, which can be a computer bus. Transceiver 222 and receiver 221 can be communicatively coupled to communication infrastructure 235, processor 233, and memory 241 as well. Memory 241 can store various application software and system software, e.g., operating system 245, application 102, and data 104 generated by application 102. More detailed operations to be performed by wireless device 101 or processor 233 are illustrated in FIG. 3.

Figure 3:
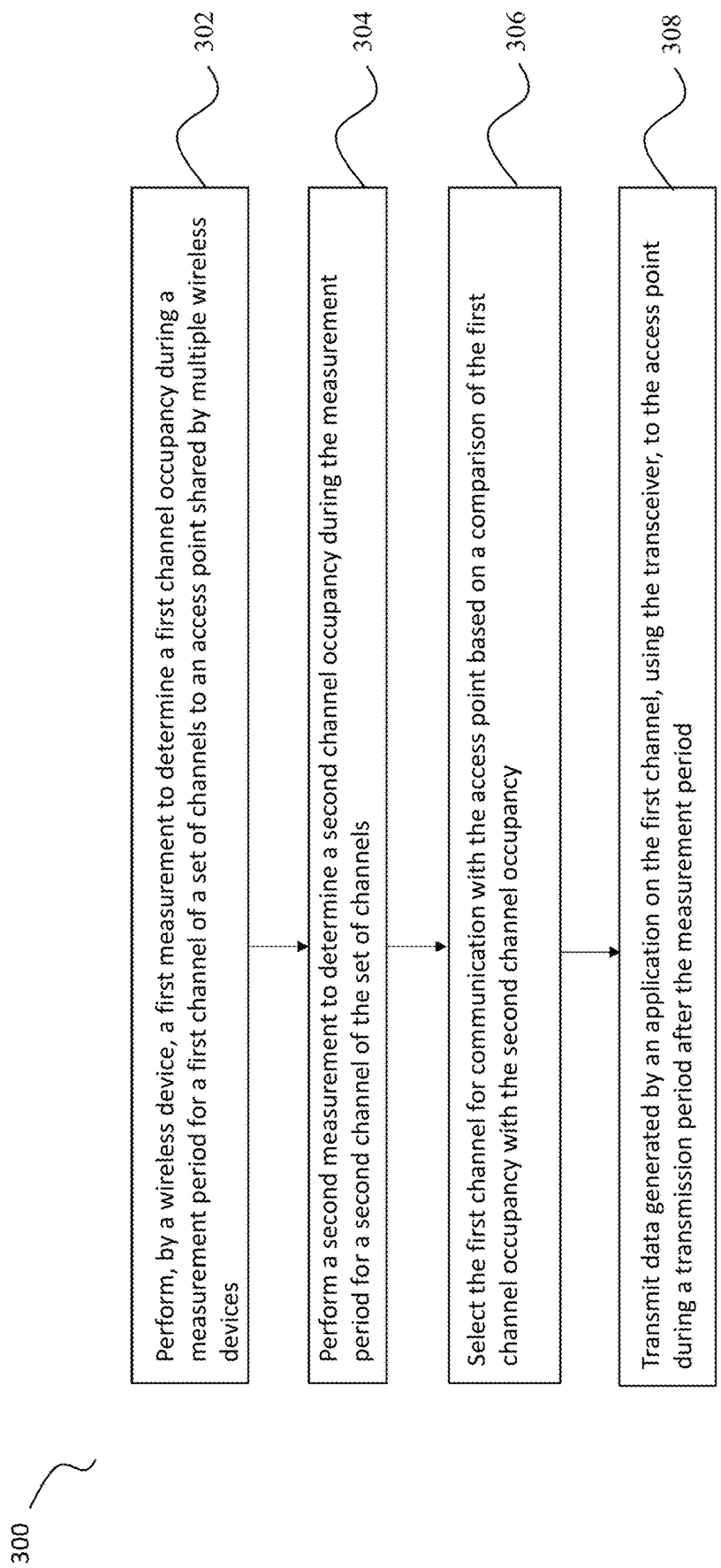
FIG. 3 illustrates an example method performed by a wireless device to select a channel among a set of channels shared by multiple wireless devices based on channel occupancies of the channels, according to some aspects of the disclosure.

FIG. 3 illustrates a method 300 performed by wireless device 101 or processor 233 to select a channel among a set of channels shared by multiple wireless devices based on channel occupancies of the channels, according to some aspects of the disclosure. FIG. 3 will be described in reference to the signal timing diagrams 410 and 420 shown in FIG. 4A. Signal timing diagram 410 illustrates various measurements during a measurement period, and signal timing diagram 420 illustrates periodic data generation by wireless device 101. For example, as shown in FIG. 1 and FIG. 4A, wireless device 101 or processor 233 can perform a first measurement to determine a first channel occupancy for channel 111 during a measure period 401, and a second measurement to determine a second channel occupancy for channel 113 during measure period 401, and further select channel 111 to transmit data 104 generated by application 102 when the first channel occupancy indicates channel 111 is less occupied than channel 113 indicated by the second channel occupancy. Data 104 is transmitted during a transmission period 403 after measure period 401. Application 102 can operate on device 101 to periodically generate data 104 during data period 451, data period 453, data period 455, data period 457, data period 459, and more. Any two adjacent data periods, e.g., data period 451 and data period 453 are separated by a data separation interval, e.g., data separation interval 419a. Similarly, data period 453 and data period 455 are separated by a data separation interval 419b.

At 302, wireless device 101 can perform a first measurement to determine a first channel occupancy during a measurement period for a first channel of the set of channels to an access point shared by multiple wireless devices. For example, as shown in FIG. 1 and FIG. 4A, wireless device 101 can perform a measurement to determine a channel occupancy during measurement period 401 for channel 111. Measurement period 401 can include multiple periodic transmission durations, e.g., a periodic transmission duration 411, a periodic transmission duration 413, a periodic transmission duration 415, and a periodic transmission duration 417. Periodic transmission duration 411, periodic transmission duration 413, periodic transmission duration 415, and periodic transmission duration 417 are different from transmission period 403. Data 104 generated by application 102 are transmitted during transmission period 403 to access point 103 or other wireless devices. Whereas, during a periodic transmission duration, e.g., periodic transmission duration 411, wireless device 101 can monitor channel 111 without really transmitting any data generated by application 102 operated on wireless device 101.

According to some aspects, each periodic transmission duration can include a frame duration, which correlates with a data period of application 102 for generating data 104. In this way, the measurement performed during the periodic transmission duration can be related to the moment data 104 is generated by application 102. Therefore, channel occupancy determined based on measurements performed during the periodic transmission duration can indicate the channel occupancy targeted to transmit data 104 generated by application 102. For example, periodic transmission duration 411 can include a frame duration 421, which correlates with data period 451 during which data 104 is generated by application 102 operated on wireless device 101. In some examples, frame duration 421 can be of about the same length as data period 451, or about 10% larger than data period 451. Accordingly, periodic transmission duration 411 can be correlated with data period 451 and data separation interval 419a. For example, data period 451 can be located at the beginning of periodic transmission duration 411, while periodic transmission duration 411 can have a length substantially equal to the length of data separation interval 419a. In addition, periodic transmission duration 413 can include a frame duration 423, which correlates with data period 453 during which data 104 is generated by application 102. Similarly, periodic transmission duration 415 can include a frame duration 425, which correlates with data period 455 during which data 104 is generated by application 102; and periodic transmission duration 417 can include a frame duration 427, which correlates with data period 457 during which data 104 is generated by application 102. Measurements are performed during measurement period 401, and data is transmitted during transmission period 403, where transmission period 403 is essentially identical to measurement period 401. Hence, measurements performed during measurement period 401 can be correlated with data 104 generated by application 102 during transmission period 403.

According to some aspects, during measurement period 401, wireless device 101 can monitor channel 111 without transmitting data on channel 111 to determine whether channel 111 is idle or occupied at least at a first time instance of a first periodic transmission duration and at a second time instance of a second periodic transmission duration. For example, wireless device 101 can monitor channel 111 at beginning time instances of at least two periodic transmission durations. In the following, as an example, wireless device 101 can monitor channel 111 at a beginning time instance of every periodic transmission duration. The functions described below can be similarly carried out when the time instances during which channel 111 being monitored are not the beginning time instances, for example middle or end time instances. As shown, wireless device 101 can monitor channel 111 at a beginning time instance 431 of periodic transmission duration 411, monitor channel 111 at a beginning time instance 433 of periodic transmission duration 413, monitor channel 111 at a beginning time instance 435 of periodic transmission duration 415, and monitor channel 111 at a beginning time instance 437 of periodic transmission duration 417, to determine channel 111 is idle or occupied at such time instances. Wireless device 101 can determine channel 111 is idle or occupied based on energy measurements over a small time interval, e.g., 1 ms to 2 ms, as a fraction of frame durations 421, 423, 425, and 427, for example. As indicated above, the energy measurements can alternatively be performed at the middle or end of the frame durations 421-427.

According to some aspects, wireless device 101 can determine a channel occupancy for channel 111 based an average waiting time. For example, an average waiting time can be calculated based on a number of times channel 111 is determined to be idle at a beginning time instance of periodic transmission durations. For example, if channel 111 is determined to be idle at beginning time instance 431 and beginning time instance 433, the number of times channel 111 is determined to be idle at a beginning time instance is 2. A transmission duration, e.g., frame duration 421 or data period 451 that is substantially similar to frame duration 421, can be 5 ms; a periodic transmission duration, e.g., periodic transmission duration 411, can be 10 ms; and measure period 401 is 40 ms. Accordingly, the first channel occupancy can be calculated as (40 ms−2*5 ms)/2=15 ms. In other words, the average waiting time is calculated as a time not used to transmit data that is averaged over the number of transmission durations. In the current example, if data is transmitted twice, each with a transmission duration of 5 ms, the total transmission time duration is 2*5 ms=10 ms. Hence, the total time not used to transmit data is 40 ms−10 ms=30 ms. Accordingly, the average waiting time for the 2 data transmissions is 30 ms/2=15 ms.

In some examples, when channel 111 is determined to be idle at the beginning time instance of the periodic transmission durations, wireless device 101 can further monitor the entire periodic transmission duration to determine a number of data collisions detected during the periodic transmission durations. Wireless device 101 can determine a channel occupancy for channel 111 based the number of data collisions detected. For example, wireless device 101 can monitor the beginning time instance of the periodic transmission durations, e.g., time instance 431, time instance 433, time instance 435, and time instance 437, and determine that channel 111 is idle at periodic transmission duration 411 and periodic transmission duration 413. Furthermore, wireless device 101 can monitor the entire periodic transmission duration 411 and periodic transmission duration 413 to count how many times other wireless devices can attempt to transmit data during periodic transmission duration 411 and periodic transmission duration 413. For example, wireless device 101 can detect 2 times another wireless device transmitting data during periodic transmission duration 411, and 3 times another wireless device transmitting data during periodic transmission duration 413. Had data been transmitted by wireless device 101 during these two periodic transmission durations, the total collision count would be 2+3=5. Therefore, the collision probability can be represented by the collision count 5. The collision probability represents the number of times the wireless device determines that a collision would have happened because of concurrent transmission from other interfering device(s) sharing channel 111.

Figure 4B:
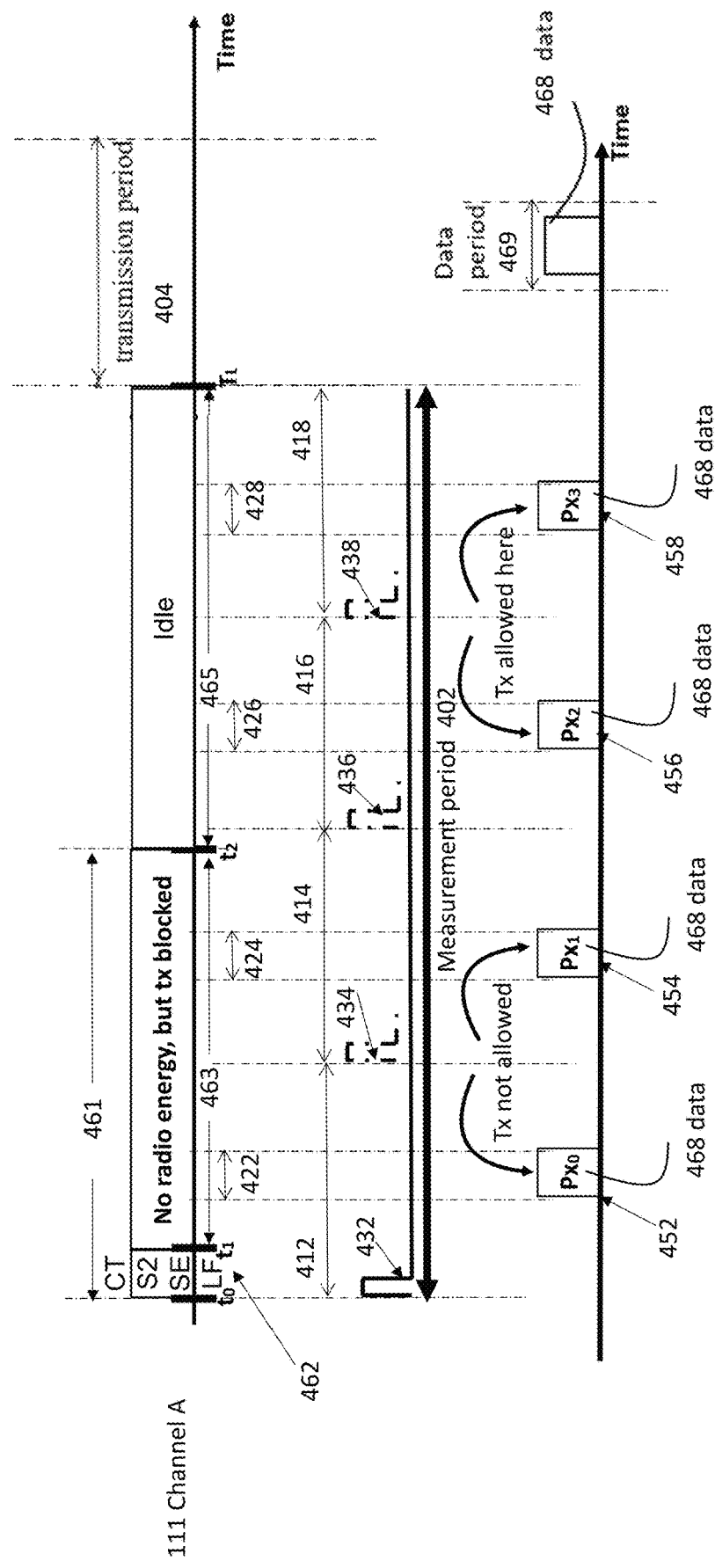

According to some aspects, monitoring a channel only at a beginning time instance of periodic transmission duration within a measurement period, or monitoring a channel during the entire periodic transmission duration within a measurement period but not the entire measurement period can lead to a less accurate estimate as how much occupied a channel can be during the entire measurement period. As shown in FIG. 4B, during a time duration 461 within a measurement period 402, channel 111 can be occupied by a system message, e.g., clear to send (CTS) to self (CTS2SELF) signal. Afterwards, channel 111 can be in an idle state during a time duration 465. Within time duration 461, at time duration 462 of time interval [t0, t1], a CTS2SELF message can be transmitted. A CTS2SELF message is a signal or message sent by wireless device 101 to itself in attempt to gain access to a wireless communication medium, e.g., channel 111. After a CTS2SELF is detected for time duration 461, CTS2SELF message is only transmitted during time duration 462 of time interval [t0, t1], while channel 111 can be blocked for a time duration 463 of time interval [t1, t2], without any message being sent or received.

As shown in FIG. 4B, measurement period 402 can include multiple periodic transmission durations, e.g., a periodic transmission duration 412, a periodic transmission duration 414, a periodic transmission duration 416, and a periodic transmission duration 418. Periodic transmission duration 412 can include a frame duration 422, which correlates with data period 452 during which data 468 is generated by application 102 operated on wireless device 101. Periodic transmission duration 414 can include a frame duration 424, which correlates with data period 454 during which data 468 is generated by application 102. Similarly, periodic transmission duration 416 can include a frame duration 426, which correlates with data period 456 during which data 468 is generated by application 102; and periodic transmission duration 418 can include a frame duration 428, which correlates with data period 458 during which data 468 is generated by application 102.

As shown in FIG. 4B, CTS2SELF message is detected at time duration 462, which is at the beginning of time duration 461. Frame duration 422, frame duration 424, frame duration 426, and frame duration 428 are not located at the beginning of the corresponding periodic transmission duration, which is different from the situation shown in FIG. 4A. If wireless device 101 only monitors channel 111 at a beginning time instance of periodic transmission durations 412, 414, 416, and 418, e.g., time instance 432, time instance 434, time instance 436, time instance 438, wireless device 101 can conclude that channel 111 is idle at time instances 434, 436, and 438, since there is no energy detected at those time instances. Hence, device 101 can conclude that channel 111 is free during time instances 434, 436, and 438, however in reality, channel 111 is blocked for time duration 463 including time instance 434 by CTS2SELF message. Accordingly, device 101 can reach an inaccurate estimate of channel 111 if only monitoring at the beginning time instance of periodic transmission durations 412, 414, 416, and 418.

In some aspects, device 101 can continuously monitor channel 111 starting from time instance 432 at the beginning of measurement period 402, extending through the entire measurement period for measurement period 402. Device 101 can determine a first portion of time, e.g., time duration 461, channel 111 is indicated as occupied, and a second period of time, e.g., time duration 463, during which there is no energy sensed on channel 111. However, device 101 can conclude that there is no data transmission allowed during time duration 463 since it is blocked for CTS2SELF message send during time duration 462. Data transmission is only possible during time duration 465. Hence, in such a situation, wireless device 101 can continuously monitor channel 111 during entire measurement period 402 to obtain a more accurate estimate of channel occupancy of channel 111. Measurements accumulated during measurement period 402 are used by wireless device 101 to determine a channel occupancy for channel 111 based the detected time duration 461 blocked for CTS2SELF message.

According to some aspects, wireless device 101 can continuously monitor channel 111 during the entire measurement period 402 to determine a number of wireless devices of the wireless network sharing channel 111 to the access point. Since channel 111 is shared by multiple wireless devices, by monitoring channel 111 during the entire measurement period 402, wireless device 101 can determine the medium access control (MAC) address of wireless devices accessing channel 111, and further determine the unique MAC addresses, which indicates the number of wireless devices sharing the channel 111 during the measurement period 402. Wireless device 101 can determine a channel occupancy for channel 111 based the detected number of wireless devices of the wireless network sharing channel 111.

Referring back to FIG. 3, at 304, wireless device 101 can perform a second measurement to determine a second channel occupancy during the measurement period for a second channel of the set of channels. As shown in FIG. 4C, the second channel can be channel 113, channel 485, or channel 487. Wireless device 101 can perform measurements by monitoring channel 111 at least at a first time instance of a first periodic transmission duration and at a second time instance of a second periodic transmission duration, e.g., time instance 431, time instance 433, time instance 435, and time instance 437, with details similar to the descriptions for FIG. 4A. Wireless device 101 can determine a channel occupancy during the measurement period 401 for channel 113, or other additional channels, e.g., channel 485, channel 487.

At 306, wireless device 101 can select the first channel to transmit data from the wireless device to the access point when the first channel occupancy indicates the first channel is less occupied than the second channel indicated by the second channel occupancy. For example, as shown in FIG. 4C, based on measurement of various time instance, e.g., time instance 431, time instance 433, time instance 435, and time instance 437, channel 111 is determined to be idle and free for access at all four time instances. Channel 113 is determined to be idle at time instance 435, and time instance 437. Channel 485 is determined to be idle at time instance 437. Channel 487 is determined to be idle at time instance 431, time instance 433, and time instance 437. Based on a proper definition of channel occupancy for channels based on the measurements, wireless device 101 can select channel 111 to transmit data from wireless device 101 to access point 103 since channel 111 has the least channel occupancy.

At 308, wireless device 101 can cause the transceiver to transmit to the access point data generated by an application operated on the wireless device in a transmission period after the measurement period. For example, as shown in FIG. 4C, data 104 generated at data period 459 can be transmitted at transmission period 403 at channel 111 to access point 103.

Figure 5:
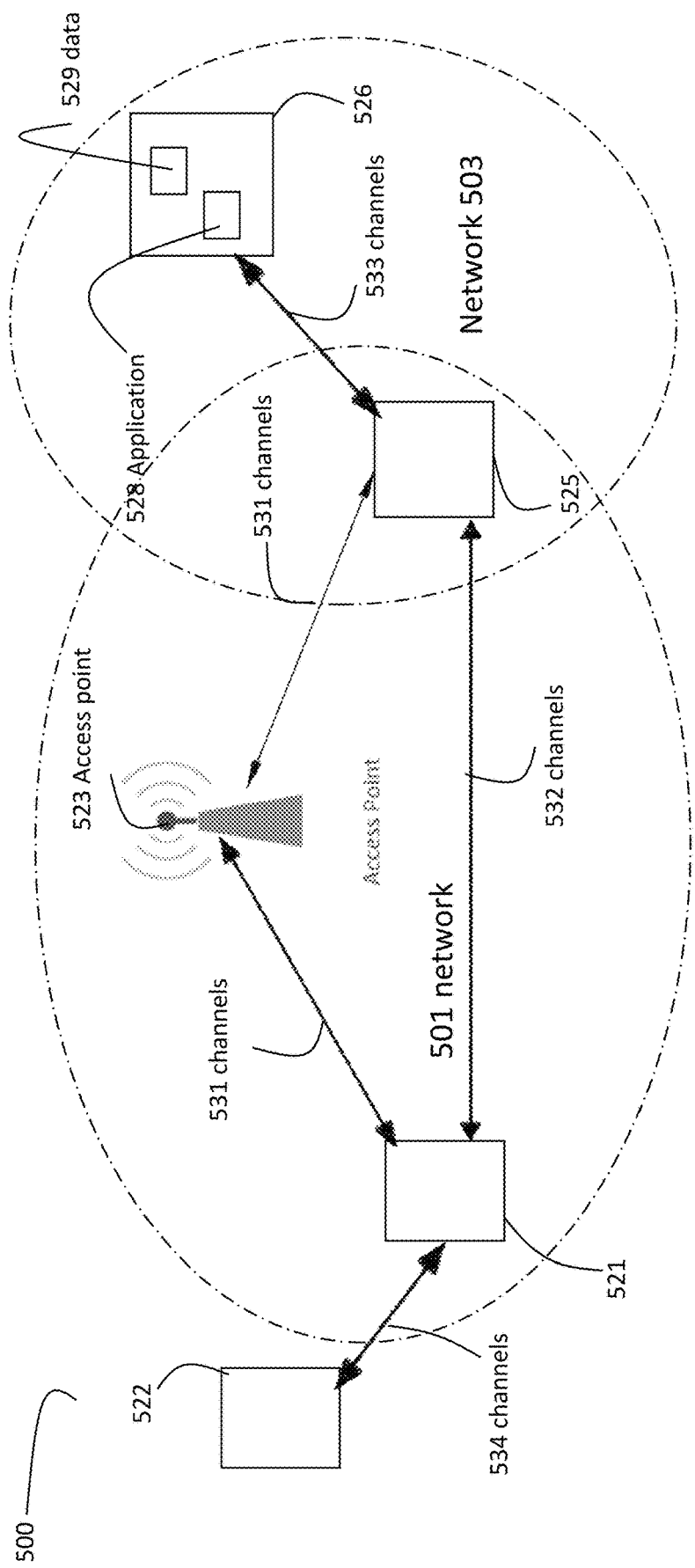
FIG. 5 illustrates another example wireless network including a wireless device to select a channel among a set of channels shared by multiple wireless devices based on channel occupancies of the channels during a measurement period, according to some aspects of the disclosure.

FIG. 5 illustrates another example wireless network 501 including a wireless device 525 to select a channel among a set of channels shared by multiple wireless devices based on channel occupancies of the channels during a measurement period, according to some aspects of the disclosure.

In some examples, wireless device 525 communicates with access point 523 in wireless network 501 over a set of channels, e.g., channel 531, which can be shared by other wireless devices, e.g., wireless device 521. There can be other channels between the wireless devices, e.g., channel 532 between wireless device 525 and wireless device 521.

In addition, wireless device 525 communicates with a wireless device 526 in wireless network 503 over a set of channels, e.g., channel 533. Application 528 can be operated on wireless device 526 to generate data 529. Wireless device 526 can wirelessly communicate with access point 523 of wireless network 501 over the set of channels to the access point, e.g., channel 531, which is shared by the set of wireless devices of wireless network 501. Wireless device 525 can operate similarly as wireless device 101 shown in FIG. 1 to select a channel to the access point, e.g., channel 531, based on measurements performed similarly as shown in FIG. 3 and FIGS. 4A-4C. Data 529 generated by application 528 operated on wireless device 526 can be transmitted to wireless device 525, which further selects a channel to the access point, e.g., channel 531, and transmit data 529 received from wireless device 526 to access point 523. There can be further wireless networks, e.g., wireless device 522 and wireless device 521 can form another wireless network to communicate over a channel 534.

In some examples, wireless network 501 and wireless network 503 can be a wireless local area network (WLAN), e.g., an IEEE 802.11a WLAN, an IEEE 802.11b WLAN, an IEEE 802.11g WLAN, an IEEE 802.11n WLAN, an IEEE 802.11ac WLAN, a Bluetooth WLAN, or a Home Radio Frequency (HomeRF) WLAN. There can be other network entities, e.g., additional access points, network controller, a relay station, bridges, routers, not shown. Other networks can be formed as well, e.g., virtual private network (VPN), a wireless LAN (WLAN), a wide area network (WAN), a wireless wide area network (WWAN), a metropolitan area network (MAN), a portion of the Internet, a cellular telephone network, a WiMax network, any other type of network, or a combination of two or more such networks.

In some examples, wireless network 501 can be a wireless network covers a larger area, and wireless network 503 can be a wireless network covers a smaller area. For example, wireless network 501 can be a wireless network covers a house or a business location, while wireless network 503 can cover one room of the house of the business location. Wireless network 501 can be a IEEE 802.11 related WLAN, while wireless network 503 can be a Bluetooth WLAN.

Figure 6:
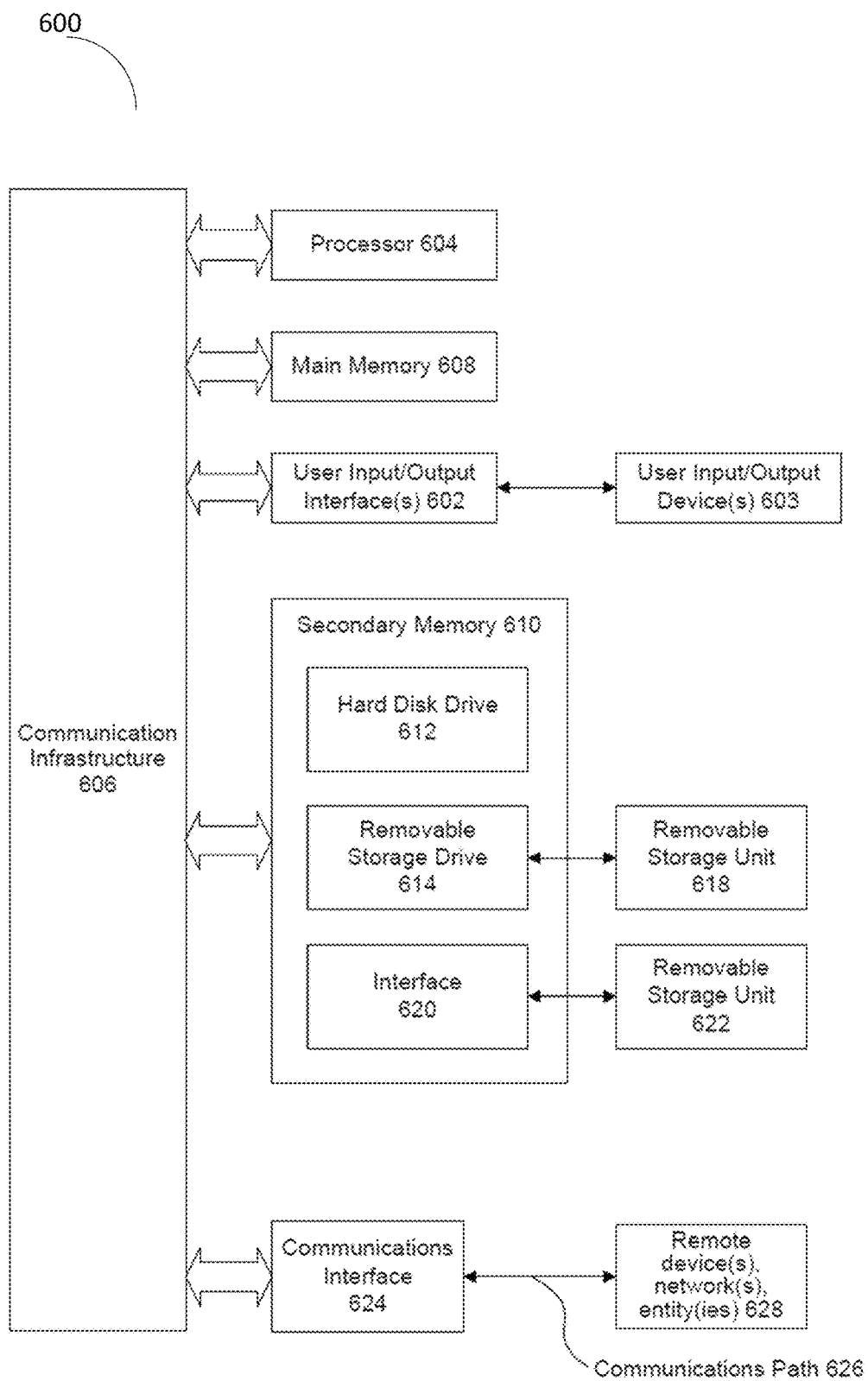
FIG. 6 is an example computer system for implementing some aspects or portion(s) thereof of the disclosure provided herein.

Various aspects can be implemented, for example, using one or more computer systems, such as computer system 600 shown in FIG. 6. Computer system 600 can be any computer capable of performing the functions described herein such as wireless device 101, access point 103 as shown in FIG. 1 and FIG. 2, and described in FIG. 3 and FIGS. 4A-4C, or wireless device 525 or wireless device 526 as shown in FIG. 5. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 608, the removable storage unit 618, the removable storage unit 622 can store instructions that, when executed by processor 604, cause processor 604 to perform operations for a wireless device or an access point, wireless device 101, access point 103 as shown in FIG. 1 and FIG. 2, or wireless device 525 or wireless device 526 as shown in FIG. 5. In some examples, the operations include those operations illustrated and described in FIG. 3 and FIGS. 4A-4C.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626. Operations of the communication interface 624 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

What is claimed is:

1. A wireless device, comprising:
   a transceiver configured to communicate with an access point of a wireless network over a set of channels shared by a set of wireless devices; and
   a processor communicatively coupled to the transceiver and configured to:
      perform a first measurement to determine a first channel occupancy for a first channel of the set of channels during a measurement period that comprises a plurality of periodic transmission durations, wherein the first measurement is performed by monitoring the first channel without transmitting data on the first channel at least at a first time instance of a first periodic transmission duration and at a second time instance of a second periodic transmission duration;
      perform a second measurement to determine a second channel occupancy for a second channel of the set of channels during the measurement period, wherein the second measurement is performed by monitoring the second channel without transmitting data on the second channel at least at the first time instance of the first periodic transmission duration and at the second time instance of the second periodic transmission duration;
      select the first channel for communication with the access point based on a comparison of the first channel occupancy with the second channel occupancy; and
      transmit data generated by an application on the first channel, using the transceiver, to the access point during a transmission period after the measurement period.

2. The wireless device of claim 1, wherein the first measurement to determine the first channel occupancy is performed by continuously monitoring the first channel during an entirety of the measurement period, and the second measurement to determine the second channel occupancy is performed by continuously monitoring the second channel during the entirety of the measurement period.

3. The wireless device of claim 2, wherein the first measurement to determine the first channel occupancy indicates energy sensed during a first portion of time of the measurement period and indicates substantially no energy sensed during a second portion of time of the measurement period.

4. The wireless device of claim 1, wherein the first measurement to determine the first channel occupancy indicates a number of wireless devices sharing the first channel to the access point.

5. The wireless device of claim 1, further comprising a receiver associated with the transceiver and the processor, wherein the receiver is configured to monitor the first channel and the second channel during the measurement period, and wherein the receiver consumes less power than the transceiver.

6. The wireless device of claim 1, wherein the first channel occupancy is determined based at least on an average wait time calculated based on a number of times the first channel is determined to be idle at beginning time instances of periodic transmission durations of the plurality of periodic transmission durations within the measurement period, and a frame duration within a periodic transmission duration of the plurality of periodic transmission durations, wherein the frame duration corresponds with a data period for the data generated by the application operated on the wireless device.

7. The wireless device of claim 1, wherein the first channel occupancy is determined based on a collision probability calculated based on a number of times the first channel is determined to be idle at beginning time instances of periodic transmission durations of the plurality of periodic transmission durations within the measurement period, and a number of data collisions detected during the periodic transmission durations.

8. The wireless device of claim 1, wherein the transmission period comprises a plurality of data periods, and wherein the application operated on the wireless device periodically generates data within a data period of the plurality of data periods, and the data period corresponds to a periodic transmission duration of the plurality of periodic transmission durations.

9. The wireless device of claim 8, wherein the data period has a same length of time as the periodic transmission duration.

10. The wireless device of claim 1, wherein the transmission period has a same length of time as the measurement period.

11. The wireless device of claim 1, wherein the set of channels comprises 11 channels in a 2.4 GHz frequency band or 45 channels in a 5 GHz frequency band.

12. The wireless device of claim 1, wherein the transmission period comprises a plurality of data periods, and wherein the first periodic transmission duration corresponds to a first data period of the plurality of data periods and the second periodic transmission duration corresponds to a second data period of the plurality of data periods.

13. The wireless device of claim 1, wherein the first channel is selected for communication with the access point based on the first channel occupancy being less than the second channel occupancy.

14. A method for wireless communication, comprising:
performing, by a wireless device and during a measurement period, a first measurement to determine a first channel occupancy for a first channel of a set of channels to an access point shared by a set of wireless devices of a wireless network, wherein the measurement period includes a plurality of periodic transmission durations, and the first measurement is performed by monitoring the first channel without transmitting data on the first channel at least at a first time instance of a first periodic transmission duration and at a second time instance of a second periodic transmission duration;
performing a second measurement to determine a second channel occupancy for a second channel of the set of channels during the measurement period, wherein the second measurement is performed by monitoring the second channel without transmitting data on the second channel at least at the first time instance of the first periodic transmission duration and at the second time instance of the second periodic transmission duration;
selecting the first channel for communication with the access point based on a comparison of the first channel occupancy with the second channel occupancy; and
transmitting or causing to transmit to the access point data generated by an application in a transmission period after the measurement period.

15. The method of claim 14, wherein the performing the first measurement includes continuously monitoring the first channel during an entirety of the measurement period.

16. The method of claim 15, wherein the first measurement to determine the first channel occupancy indicates energy sensed during a first portion of time of the measurement period and indicates substantially no energy sensed during a second portion of time of the measurement period.

17. The method of claim 15, wherein the first measurement to determine the first channel occupancy indicates a number of wireless devices sharing the first channel to the access point.

18. The method of claim 15, wherein the first channel occupancy is determined based at least on an average wait time calculated based on a number of times the first channel is determined to be idle at beginning time instances of periodic transmission durations of the plurality of periodic transmission durations within the measurement period, and a frame duration within a periodic transmission duration of the plurality of periodic transmission durations, wherein the frame duration corresponds with a data period for the data generated by the application operated on the wireless device.

19. A non-transitory computer-readable medium storing instructions that, when executed by a processor of a wireless device, cause the wireless device to perform operations, the operations comprising:
performing, during a measurement period, a first measurement to determine a first channel occupancy for a first channel of a set of channels to an access point shared by a set of wireless devices of a wireless network, wherein the measurement period includes a plurality of periodic transmission durations, and the first measurement is performed by monitoring the first channel without transmitting data on the first channel at least at a first time instance of a first periodic transmission duration and at a second time instance of a second periodic transmission duration;
performing a second measurement to determine a second channel occupancy for a second channel of the set of channels during the measurement period, wherein the second measurement is performed by monitoring the second channel without transmitting data on the second channel at least at the first time instance of the first periodic transmission duration and at the second time instance of the second periodic transmission duration;
selecting the first channel for communication with the access point based on a comparison of the first channel occupancy with the second channel occupancy; and
transmitting or causing to transmit to the access point data generated by an application in a transmission period after the measurement period.

20. The non-transitory computer-readable medium of claim 19, wherein the set of channels comprises 11 channels in a 2.4 GHz frequency band or 45 channels in a 5 GHz frequency band;
wherein the transmission period has a same length of time as the measurement period; and
wherein the first channel is selected for communication with the access point based on the first channel occupancy being less than the second channel occupancy.

\* \* \* \* \*